United States Patent [19]

Eggertson et al.

[11] Patent Number: 4,756,113

[45] Date of Patent: Jul. 12, 1988

[54] FISHING DEVICE

[76] Inventors: D. Frank Eggertson, P.O. Box 1153, Camrose, Alberta, Canada, T4V 1X2; Lawrence W. Hillaby, 3908 52 St., Camrose, Alberta, Canada, T4V 3H7

[21] Appl. No.: 100,329

[22] Filed: Sep. 23, 1987

[51] Int. Cl.$^4$ ............................................. A01K 91/02
[52] U.S. Cl. ........................................................ 43/19
[58] Field of Search ................................... 43/17.5, 19

[56] References Cited

U.S. PATENT DOCUMENTS 3,862,509  1/1975  Petersen ............................. 43/17.5
4,501,085  2/1985  Barnes .................................... 43/19

Primary Examiner—M. Jordan
Attorney, Agent, or Firm—Frank P. Presta

[57] ABSTRACT

A fishing rod, having a longitudinal through bore for the reception of the terminal tackle (fly, spoon, spinner, plug, baited hook, etc.) replaces the conventional rod and has a port at its rearward end, communicating with a charge of air from the operator's lungs to launch said terminal tackle, thus eliminating the need for the traditional arm casting action required in the use of conventional fishing rods. The bore includes a second lateral port a small distance forward of the rearward port for receiving a flexible strand, wound on a conventional fishing reel, and having its free end attched to the terminal tackle. Said terminal tackle has an integrated impeller-seal, designed to cooperate with various styles of lures, bait and the like.

9 Claims, 1 Drawing Sheet

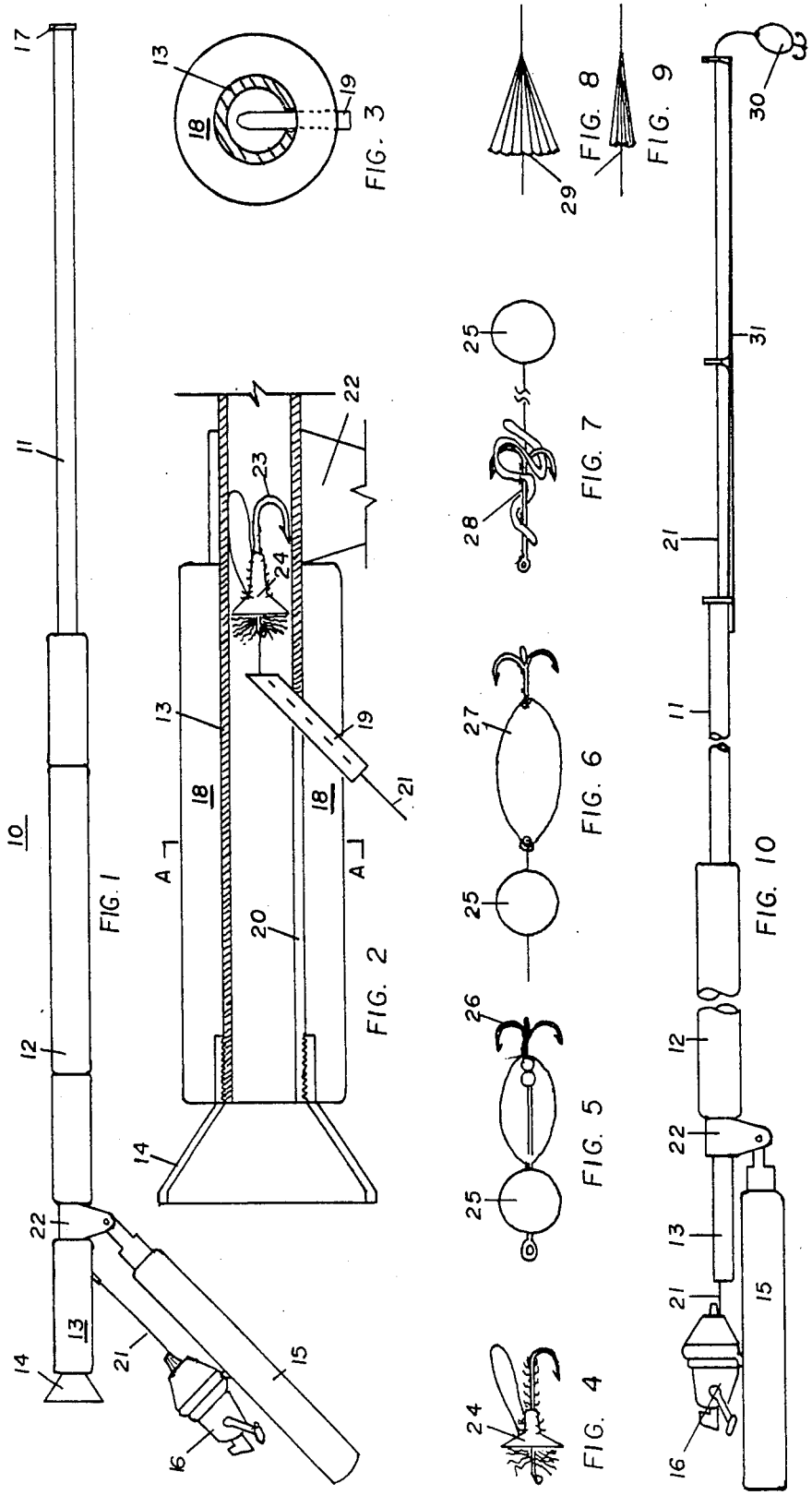

FISHING DEVICE

BACKGROUND OF THE INVENTION

This invention relates to a fishing device and, more specifically, to such a device having a new and improved construction for casting or shooting the terminal tackle out to an intended target area.

PRIOR ART

It is presently common to cast the terminal tackle, in catapult fashion, by employing a long, tapered flexible rod. It is, of course, necessary in the act of casting to have a sufficiently clear working area to facilitate rod, line and terminal tackle movement (the art of fly casting being the extreme example). Methods of this type are ineffective in confined quarters and impose, on the angler, certain restrictive body postures. These methods of casting demand an acquired skill level (hand-eye coordination, timing, etc.) to produce consistently accurate results in terminal tackle placement. It is also commonly accepted that the catching of certain species of fish (e.g., trout) demands a stealthy approach which the aforementioned methods of casting preclude as they inherently require exposure of one form or another. Prior inventors, captivated by accurate and long distance casts particularly to where obstructions render the target area under contemplation virtually inaccessible, have experimented with and devised many and varied types and forms of gun-like and catapulting fishing devices. So far as is known, such prior adaptations appear not to have met with wide-spread adoption and use as being too mechanically complicated, too expensive to manufacture, too restricted to specific types of terminal tackle, too unwieldly and/or functionally infeasible.

SUMMARY OF THE INVENTION

This invention is an improvement over the prior art by providing a tubular flexible rod with a longitudinal through bore for receiving the fishing line and the terminal tackle with the integrated impeller-seal. When a charge of gas (provided either by the angler's lungs or an attached compression chamber) is released, it propells the terminal tackle down the bore of the rod and out on a controlled trajectory to its intended target.

This technique is advantageous over the catapult methods of casting by eliminating the rod movement and backcast required for propulsion. This device has further advantages over the previous gun-like variations in its:

ability to successfully function with lung pressure;

simple functional and operational design;

compatibility with virtually any style, shape, form or design of terminal tackle (restricted only by bore size); and adaptability to varying bore sizes and lengths, it being understood that, if casting distance is desired, increased bore sizes may necessitate a source of compressed gas of greater capacity than the lungs can provide.

In operation, the aforementioned advantages allow the angler to:

function in confined quarters (i.e., dense brush, small or covered boat, crowded pier, etc.);

aim the rod directly at the intended target, thus creating the opportunity to operate through an open window (i.e., camper, tent, covered boat, vehicle) or from a camouflaged enclosure;

cast from a range of body positions (i.e. standing to prone), thus facilitating concealment and permitting a closer approach to the intended target area;

attain satisfactory proficiency rapidly by eliminating hand-eye coordination and line release timing which is very apparent with novice fly fishermen and even more so with young children;

alternate various types of terminal tackle (e.g., fly, spinner, spoon bait, plug, etc.) without necessitating other component changes (e.g., rod, reel or line);

because the line and terminal tackle are always contained within the rod in a ready-to-launch fashion, conveniently convey this fishing rod from storage to transport to use with no assembly; and rapidly convert this fishing rod to a conventional casting rod by simply pivoting the reel support handle rearwardly and re-routing the fishing line.

In summation, the general object of this invention is to provide a fishing device of uncomplicated functional and operational form, primarily utilizing, but not limiting to, lung pressure as a means of propulsion of the terminal tackle.

BRIEF DESCRIPTION OF THE DRAWING

FIG. 1 is a side elevational view of the fishing device in a firing mode;

FIG. 2 is an enlarged side elevational view, partly in section, of the breech end of the fishing device shown in FIG. 1;

FIG. 3 is a sectional view taken substantially along line A—A in FIG. 2;

FIGS. 4 through 9 are side elevational views of various embodiments of impellers and their relationship to terminal tackle that may be used in the fishing device of this invention; and FIG. 10 is a side elevational view of the fishing device in a casting mode.

DESCRIPTION OF THE PREFERRED EMBODIMENTS

Referring to FIG. 1, the device, according to one embodiment of the present invention, as designated by the reference numeral 10, comprises a rod 11, a rod support stock 12, a breech 13, a mouth-piece 14, a reel support handle 15 and a conventional fishing reel 16. The rod 11, of suitable length and material to exhibit sufficient flexural strength and dimensional stability, is characterized by a longitudinal through bore with a circular anti-wear line guide 17 coaxially attached to its forward end. The determination of the bore size is given some latitude by the pressure/volume/velocity relationship and desired terminal tackle size/weight. However, the effective use of lung pressure imposes an optimum operating dimension of approximately ⅜" to ¾" in diameter.

The reel support handle 15 is pivotally attached at 22 to the rod 11 immediately forward of the breech 13, the support handle 15 being of sufficient length that the conventionally mounted fishing reel 16 is somewhat centrally located to permit the support handle to fold into the conventional casting mode (FIG. 10) to allow the reel 16 to clear the breech end 13 of the rod 11 while leaving sufficient extension of said support handle 15 to accommodate hand placement behind the reel 16. When in the firing mode, the present construction permits some latitude in the angle formed by the reel support handle 15 and the longitudinal axis of the rod; however, the optimum occurs when such angle is at the minimum without the reel support handle 15 and the attached reel 16 interfering with the angler's access to the mouthpiece 14.

As shown in FIG. 2, the cylindrical breech sleeve 18 is slidingly and sealingly attached over the breech end 13 of the rod 11 and has a lateral port intermediate its ends to receive the anti-friction line feed tube 19 at an angle that permits a substantially parallel relationship of said line feed tube 19 to the reel support handle 15. The anti-friction line feed tube 19 extends through the breech sleeve wall 18 to terminate approximately at the breech sleeve's longitudinal axis. A longitudinal slot 20 in the breech end of the rod 11, immediately above the reel 16, accommodates the inner extension of the feed tube 19 when the breech sleeve 18 is slid into position.

To achieve minimal deflection of the fishing line 21 feeding from the reel 16 through the line feed tube 19 and ultimately down the bore, the placement of the feed tube 19, and angle thereby formed, must create a common longitudinal axis between the feed tube 19, the reel 16 and the fishing line 21 extending therebetween. The anti-friction line feed tube 19 can be formed of various materials (i.e., teflon, nylon, etc.) and must have a sufficient inner diameter to freely accept the fishing line 21 with minimal pressure loss when firing.

The breech sleeve 18 is held in place at its forward end by the reel support pivot member 22 and at its posterior end by the threadably attached mouth-piece 14. By removing the breech sleeve 18 the fishing line 21 can be readily threaded through the line feed tube 19 and attached to the terminal tackle 23.

The threadably attached mouth-piece 14 has its posterior end of sufficient rearwardly expanding diameter to sealingly communicate exteriorly with the operator's lips, allowing a sudden burst of air from the lungs to enter the breech chamber 13, thus propelling the terminal tackle 23 down the bore. The mouth-piece 14 can be readily detached to accommodate the connection of an alternate source of compressed gas, if necessary.

Referring to FIG. 4 the impeller 24 according to one embodiment, is designed to be incorporated onto the shank of the type of fish hooks normally used in the sport of fly fishing. The disk-shaped head of the impeller 24 is designed to slidingly seal with the bore of the rod, the reduced cylindrical end portion reinforcing the impeller head and providing stability for mounting the impeller onto the shank of the fishing hook. The fly tying materials can then be added according to preferred fly-tying techniques, thus incorporating the impeller, fly-tying materials and hook into a finished lure.

Referring to FIGS. 5, 6 and 7, the impeller 25 according to a further embodiment may be substantially spherical, of such diameter to slidingly seal in the bore of the rod, and can be fixedly or slidably attached directly onto the terminal tackle 26 (FIG. 5); onto the fishing line rearwardly of the terminal tackle 27 (between the terminal tackle 27 and the reel 16—FIG. 6); or by some securing means extending forwardly of the terminal tackle 28 (FIG. 7). It should be noted that when the impeller 25 is located on the fishing line 21 the terminal tackle 27 can be readily changed without changing the impeller 25.

Referring to FIGS. 8 and 9, the impeller 29, in a still further embodiment, may be an expandable umbrella member which remains in a collapsed form (FIG. 9) concentrically around the longitudinal axis of the fishing line or the terminal tackle. The burst of air entering the breech at firing, forces the umbrella into its expanded configuration (FIG. 8), thus allowing it to slidingly seal with the bore of the rod 11. When the impeller 29 exits the rod 11, the air pressure acting on the umbrella equalizes and it again collapses, substantially reducing air drag and visibility.

The position, shape, form, color and materials used in the aforementioned impeller embodiments may vary greatly, depending on conditions and the desired species of fish being sought. It is understood that extremes from highly visible (brightly colored attractant) to near invisible (transparent), floating to sinking, and erratic to non-erratic retrieval action will be desired under different conditions, and can be obtained by using a wide variety of shapes, patterns, colors, densities and materials without departing from the inventive concept herein disclosed.

While the preferred embodiment of the invention has been illustrated and described, it should be understood that it is not limited to operation by lung pressure. This fishing rod is designed to cooperatively communicate with alternate pressure sources without changing the principles of the inventive idea. Greater casting distances can be obtained from the increased volumes and pressures available through these sources, and accordingly the upper limit on the bore diameter can also be increased. Therefore, when extended casting is desired (e.g., surf fishing, shore fishing, etc.), this fishing rod can function with little or no modifications to its basic design.

Another feature of the invention is that, by its construction, it can be readily converted into a conventional spin-casting rod as shown in FIG. 10. Conversion is accomplished by simply detaching the threaded mouth-piece 14, removing the breech sleeve 18 with the line feed tube 19, and rearwardly pivoting the reel support handle 15 to a substantially parallel position with the rod 11. The exposed posterior breech bore 13 and the reel 16 are now in a positional relationship creating a substantially common longitudinal axis, thus permitting the fishing line 21 from the reel 16 and terminal tackle 30 to feed directly down the bore of the rod 11, thereby allowing the angler, by gripping the rearwardly extending portion of the reel support handle 15 to utilize conventional arm casting techniques.

When in the spin-cast mode, a flexible rod extension 31 of conventional design and material, although not critical to the spin-cast functionality, may be removably attached to the forward end of the rod 11, thus creating a fishing rod of more familiar length, flexibility, feel and balance.

In operation, the mouth-piece 14 and breech sleeve 18 are removed, a sufficient length of fishing line 21 is stripped from the reel 16 and fed through the line feed tube 19 to exit the forward end of the breech sleeve 18. The desired terminal tackle 23, with impeller 24, is attached to the line 21, drawn back into the breech sleeve 18, stopping against the line feed tube 19. The breech sleeve 18 is then slid back into position with the terminal tackle 23 fitting inside the bore of the rod 11 and the mouth-piece 14 reattached. As previously described, the line feed tube 19 extends into and terminates approximately at the bore center, thus centering the fishing line 21, impeller 24 and terminal tackle 23, and serving as a stop to consistently locate the terminal tackle 23 in the firing position, as well as preventing the angler from inhaling the terminal tackle 23.

In preparation for firing, the line release mechanism of reel 16 is activated, the fishing rod is placed in the firing position (mouth applied to mouth-piece 14) and aimed at the intended target. A sharp burst of breath propels the impeller 24 and terminal tackle 23 down the bore and out the end of the rod 11 in the desired trajectory. Thereafter, this fishing rod is manipulated in the conventional fashion to land the hooked fish and retrieve the terminal tackle 23 to its firing position.

It should be noted at this point that if a change in the terminal tackle 23 is desired, it is expedient to do so prior to its complete retrieval into the rod 11.

Obviously, the invention is susceptible to changes in structure, process and product, some of which have been previously noted, without departing from the inventive concept. It is desired, therefore, that the scope of the inventive concept not be confined specifically to the embodiment shown in the drawings and described herein.

What is claimed is:

1. A fishing device, comprising in combination:
   a rod having a longitudinal bore extending therethrough, said rod having a forward and breech end;
   a breech sleeve slidably mounted on the breech end of said rod, said breech sleeve having a wall with an opening therethrough;
   a reel support handle movably attached to said rod immediately forward of said breech sleeve;
   a fishing reel containing a flexible strand mounted on said support handle;
   an anti-friction line feed tube extending through the wall opening of said breech sleeve to its center portion;
   means for conveying air pressure removably attached to the posterior end of said rod in communication with the bore therethrough; and
   terminal tackle and impeller means disposed within said rod in sliding and sealing relation therewith;
   said flexible strand extending from said fishing reel through said feed tube and being connected to said tackle and impeller means.

2. The fishing device according to claim 1 and further including:
   an anti-friction wear guide affixed to the forward end of said rod;
   a longitudinally disposed slot in the wall of said rod extending forwardly from the breech end thereof and radially disposed to be directly adjacent to the reel, so as to define the opening to receive the line feed tube; and
   said rod having an externally threaded breech end to receive the air pressure conveying means.

3. The fishing device according to claim 1 wherein the breech sleeve is slidably and sealingly received on the exterior breech end of the rod, and has lateral port disposed at an angle to receive the line feed tube therethrough.

4. The fishing device according to claim 3 wherein the line feed tube is fixedly attached through the lateral port of the breech sleeve at such an angle as to facilitate minimal deflection of the fishing strand entering the breech and extending into the center of the said breech to function as a terminal tackle stop.

5. The fishing device according to claim 1 wherein the air pressure conveying means is threadably attached to the breech end of the said rod.

6. The combination according to claim 1 wherein the reel support handle is privotally secured to said rod immediately forward of the breech sleeve, said reel support handle incorporating a securing means approximately at its mid-point to mount a fishing reel thereon in a stationary manner, said support handle extending rearwardly, past the reel, to provide a hand grip portion.

7. The fishing device according to claim 1 wherein said air pressure conveying means is a mouth-piece.

8. The fishing device according to claim 1 wherein said air pressure conveying means is a compressed air container.

9. The fishing device according to claim 1 wherein said reel is secured to said support handle in a substantially parallel position to said rod to permit said flexible strand to feed directly through the bore of said rod for attachment to said terminal tackle and impeller means.

* * * * *